Jan. 30, 1934.     A. A. KNEE     1,945,319
FRAUD PREVENTIVE DEVICE FOR CHECK CONTROLLED APPARATUS
Original Filed June 14, 1930     8 Sheets-Sheet 1

A. A. KNEE,
INVENTOR

BY [signature]
ATTORNEY

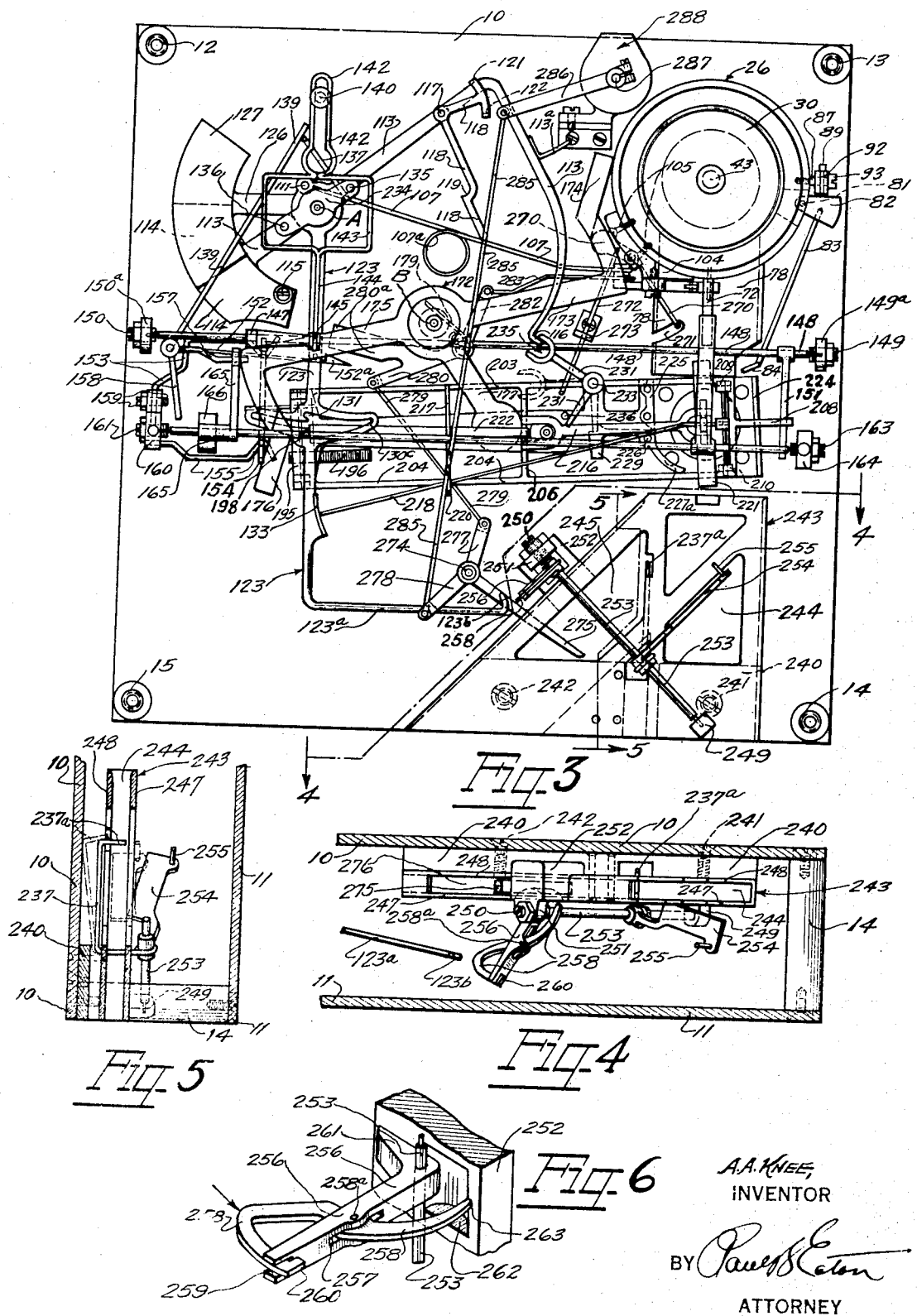

Jan. 30, 1934.     A. A. KNEE     1,945,319
FRAUD PREVENTIVE DEVICE FOR CHECK CONTROLLED APPARATUS
Original Filed June 14, 1930     8 Sheets-Sheet 3

A. A. KNEE,
INVENTOR

BY
ATTORNEY

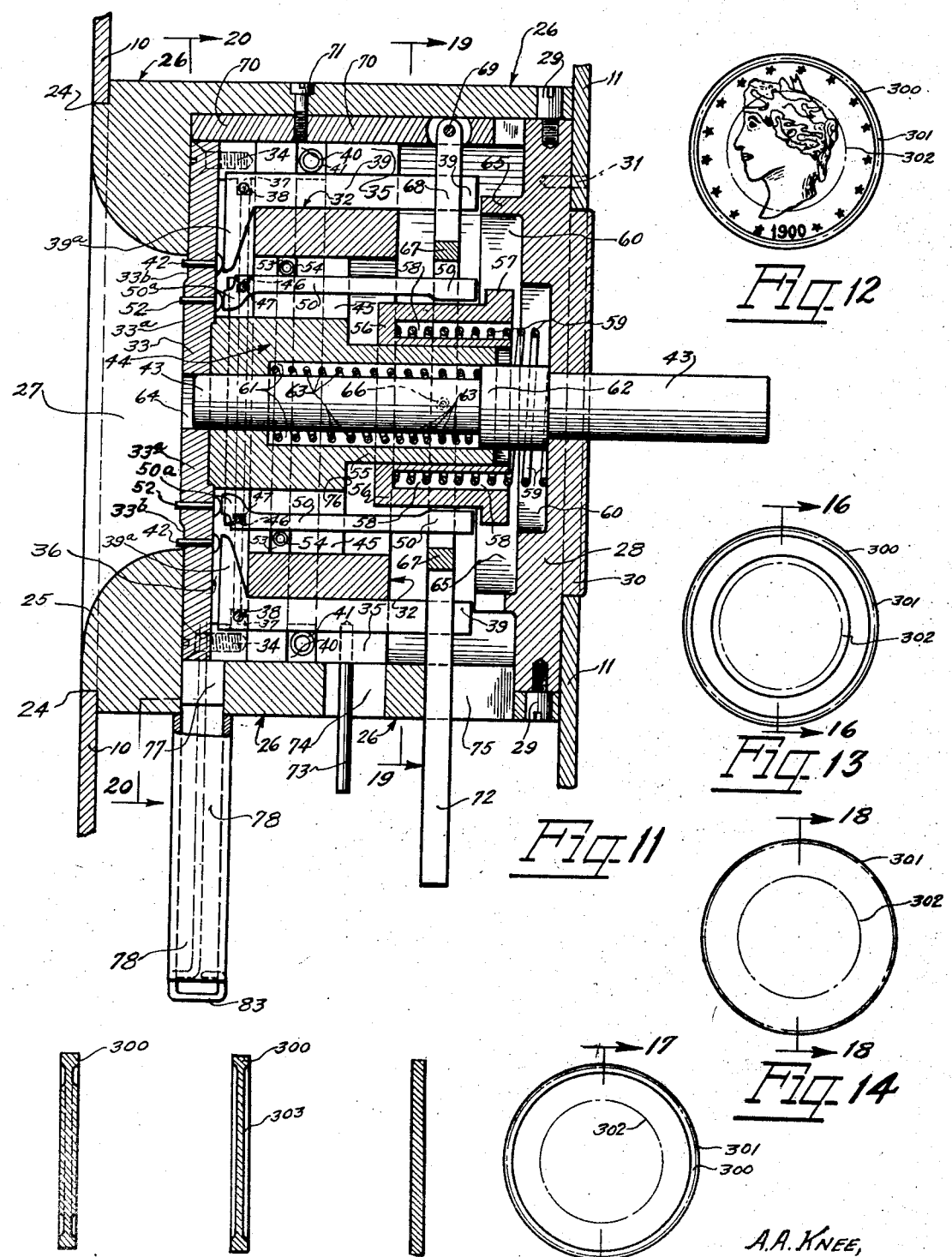

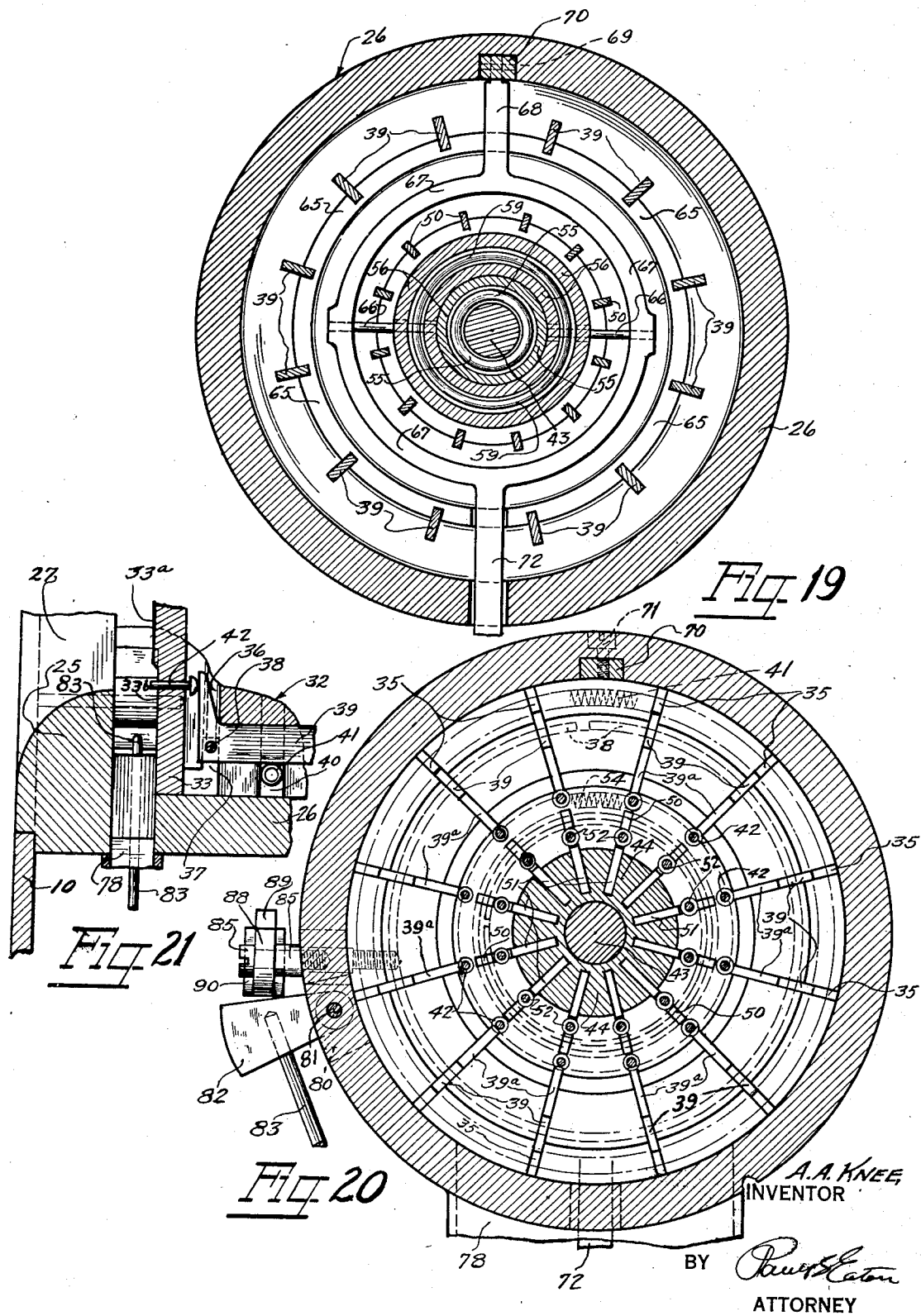

Jan. 30, 1934.  A. A. KNEE  1,945,319
FRAUD PREVENTIVE DEVICE FOR CHECK CONTROLLED APPARATUS
Original Filed June 14, 1930  8 Sheets-Sheet 6
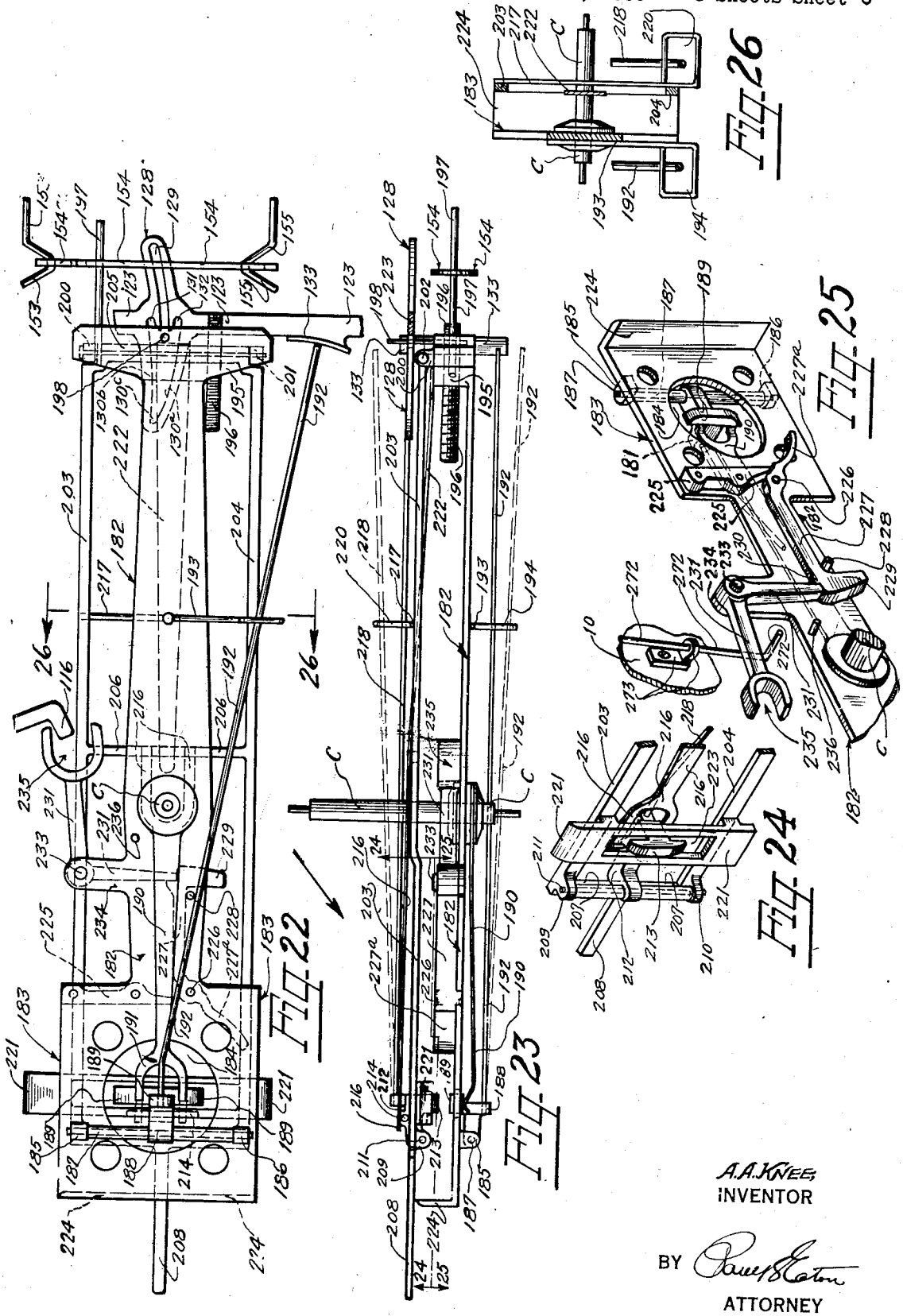
A.A. KNEE
INVENTOR
BY
ATTORNEY

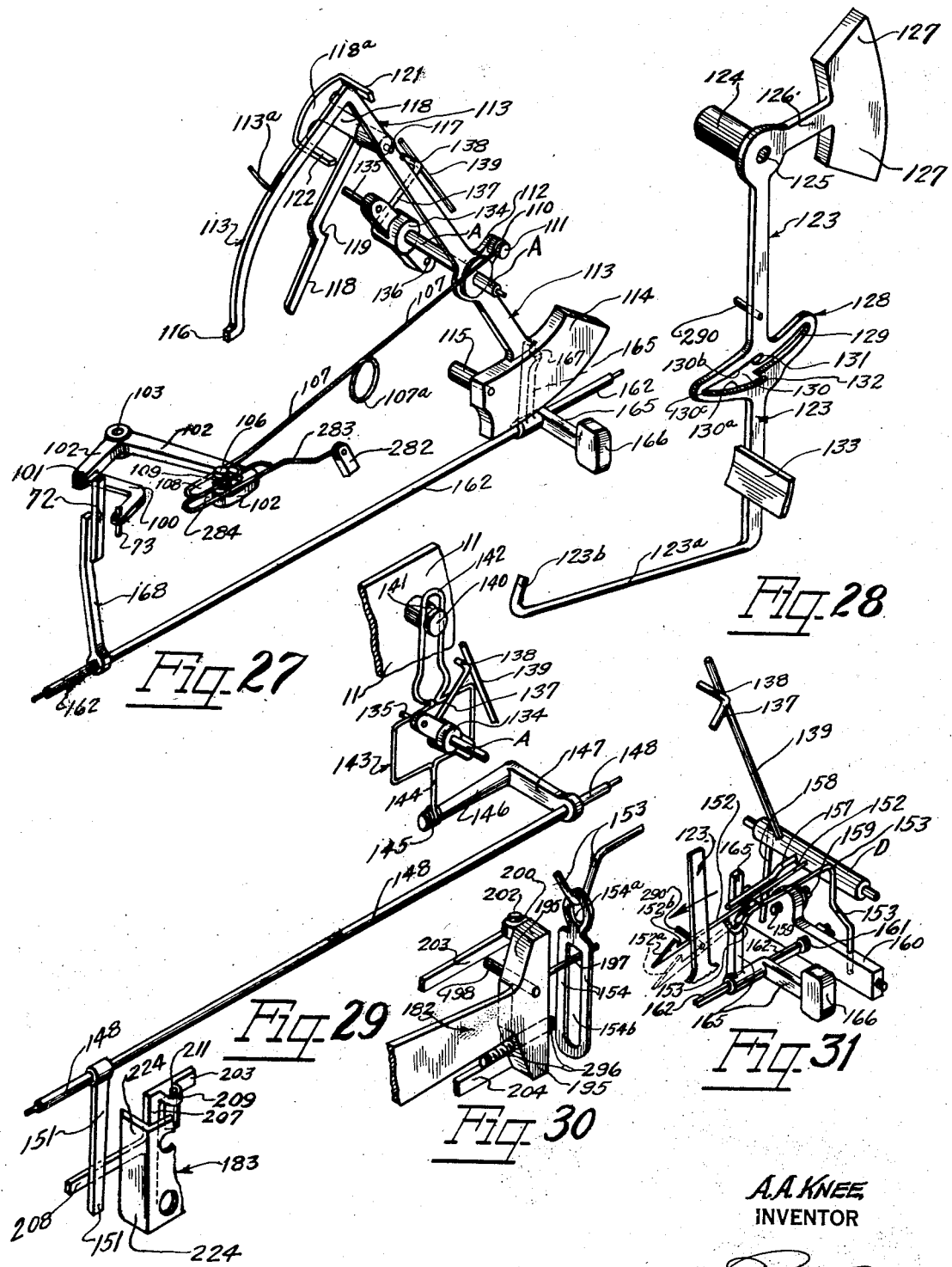

Patented Jan. 30, 1934

1,945,319

UNITED STATES PATENT OFFICE 1,945,319

FRAUD PREVENTIVE DEVICE FOR CHECK CONTROLLED APPARATUS

Aaron A. Knee, Charlotte, N. C., assignor to Vanak Corporation, Charlotte, N. C., a corporation of North Carolina Application June 14, 1930, Serial No. 461,099
Renewed May 24, 1933

7 Claims. (Cl. 194—97)

This invention relates to fraud preventive devices for check controlled apparatus, and more especially to a fraud preventive device having a combination of means for successively and in combination detecting checks other than genuine and rejecting them, and returning the same to the depositor of the check.

An object of my invention is to provide a fraud preventive device comprising a check controlled apparatus, in which a plurality of means are provided for scrutinizing the configuration of the check and also the weight of the check, and if said check is not genuine both as to weight and configuration the same will be rejected by my fraud preventive means.

Another object of my invention is to provide a fraud preventive device adapted to be associated with check controlled apparatus, said fraud preventive device comprising a plurality of means working in combination to detect checks other than genuine, and to return said checks to the exterior of the machine, without delivering the same to the check controlled apparatus for operating the same.

Another object of my invention is to provide a check controlled device which is adapted to be associated with a check controlled vending machine or any machine which is adapted to be operated by coins, checks and the like, in which means are provided for detecting irregularities in the checks, both as to surface configuration and as to weight, and my fraud preventive device comprises first a device for operating certain mechanisms by the configuration of the check, and then passing the check on through my fraud preventive device to certain weighing or balancing means, which are adapted to be so adjusted as to receive said checks, and if the check is not genuine to cooperate with the other features of my device, so as to reject the check and to return it to the exterior of the machine if not genuine, and to receive the check and direct it into the check controlled apparatus with which my fraud preventive means are associated if the check is genuine.

Another object of my invention is to provide a fraud preventive device for check controlled apparatus, in which means are adapted to be operated by the configuration of the check, not only as to its surface configuration on the side, but also in which the check must be of a given diameter in order to successfully pass the test of my fraud preventive means, and also said check must have a given weight in addition to certain face configurations and a certain diameter in order to be received by the fraud preventive device and passed on into the check controlled apparatus.

Another object of my invention is to provide a check controlled apparatus having means controlled by the configuration of the sides of the check for determining as to whether or not the check will be accepted or returned to the operator and also having means for weighing the check after it has passed the configuration reading means and also having means for gaging the relative thickness of the central portion of the check with relation to the peripheral thickness and also having means controlled by the configuration of the check to determine whether or not certain deflecting mechanism shall be operated or rendered inoperative to determine the path the check will pass after passing through the various testing mechanisms included in my invention.

Some of the objects of my invention having been stated other objects will appear as the description proceeds, when taken in connection with the accompanying drawings, in which—

Figure 3 is a reverse side elevation from Figure 1 and taken along the line 3—3 in Figures 2 and 8 with nearest side plate removed;

Figure 4 is an enlarged detail view looking downward on a portion of the chute for directing the checks into the check controlled apparatus or to the exterior of the machine;

Figure 5 is a cross-sectional view taken along the line 5—5 in Figure 3;

Figure 6 is a perspective detail view of the lower right hand portion of Figure 4;

Figure 11 is a longitudinal cross-sectional view of the cylindrical means and taken along the line 11—11 in Figure 1;

Figure 12 is a side elevation of one form of check, this check representing a five-cent piece of American money;

Figure 13 is a face view of a check of another form;

Figure 14 is a face view of a different type of check from the one previously shown;

Figure 15 is a face view of another type of check having a bevel around the edge thereof;

Figure 16 is a cross-sectional view taken along the line 16—16 in Figure 13;

Figure 17 is a cross-sectional view taken along the line 17—17 in Figure 15;

Figure 18 is a cross-sectional view taken along the line 18—18 in Figure 14;

Figure 19 is a cross-sectional view taken along the line 19—19 in Figure 11;

Figure 20 is a cross-sectional view taken along the line 20—20 in Figure 11;

Figure 21 is an enlarged detail view of the lower left hand corner of Figure 11;

Figure 22 is an enlarged side elevation of the balancing lever and associated parts;

Figure 23 is a plan view of Figure 22;

Figure 24 is a perspective view of the upper left hand corner of Figure 23; taken along the line 24—24 in Figure 23;

Figure 25 is a perspective view of the lower left hand corner of Figure 22 looking at the same from a direction indicated by an arrow; taken along the line 25—25 in Figure 23;

Figure 26 is a cross-sectional view of the upper left hand corner of Figure 23;

Figure 27 is a perspective view of a portion of the mechanism in the upper right hand corner of Figure 1 which is fixedly mounted on the main shaft and also associated parts;

Figure 28 is a perspective view of another portion of the mechanism which is pivotally mounted on the main shaft shown in Figure 27;

Figure 29 is a perspective view of a portion of the means for opening the coin receiving chamber in the balancing mechanism;

Figure 30 is a perspective view of the right hand portion of the balancing lever as shown in Figure 1, showing a part of the stabilizing means;

Figure 31 is a perspective view of the mechanism shown in the right middle portion of Figure 1, this being the means for supporting the stabilizing mechanism and for controlling the deflector operating mechanism;

Figure 1:
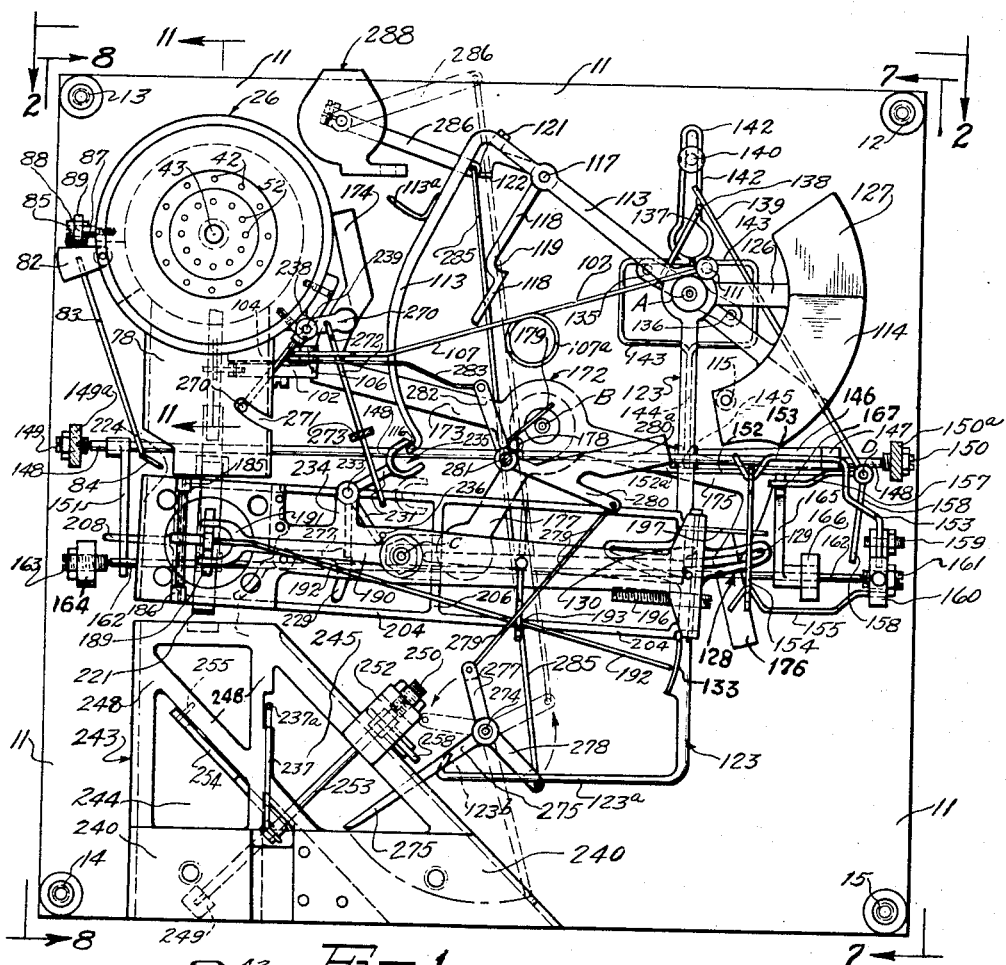
Figure 1 is a side elevation taken along the line 1—1 in Figures 2 and 7 with nearest side plate removed.
Figure 2:
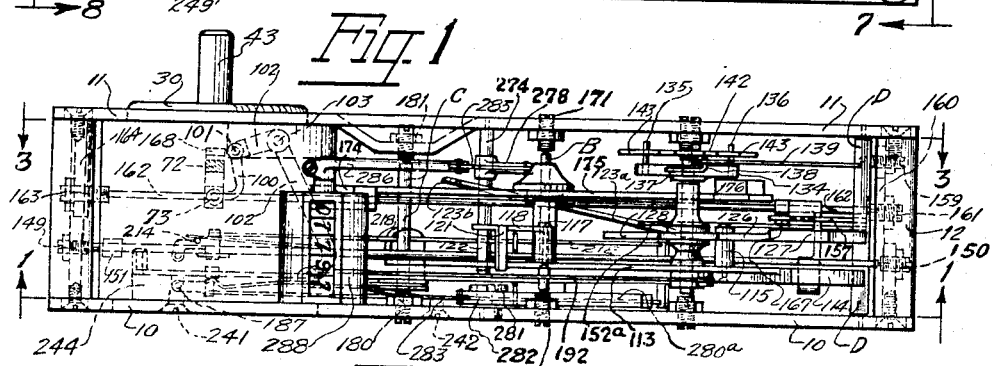
Figure 2 is a top plan view of Figure 1 taken along the line 2—2 in Figure 1 showing both side plates in position.
Figures 7, 8:
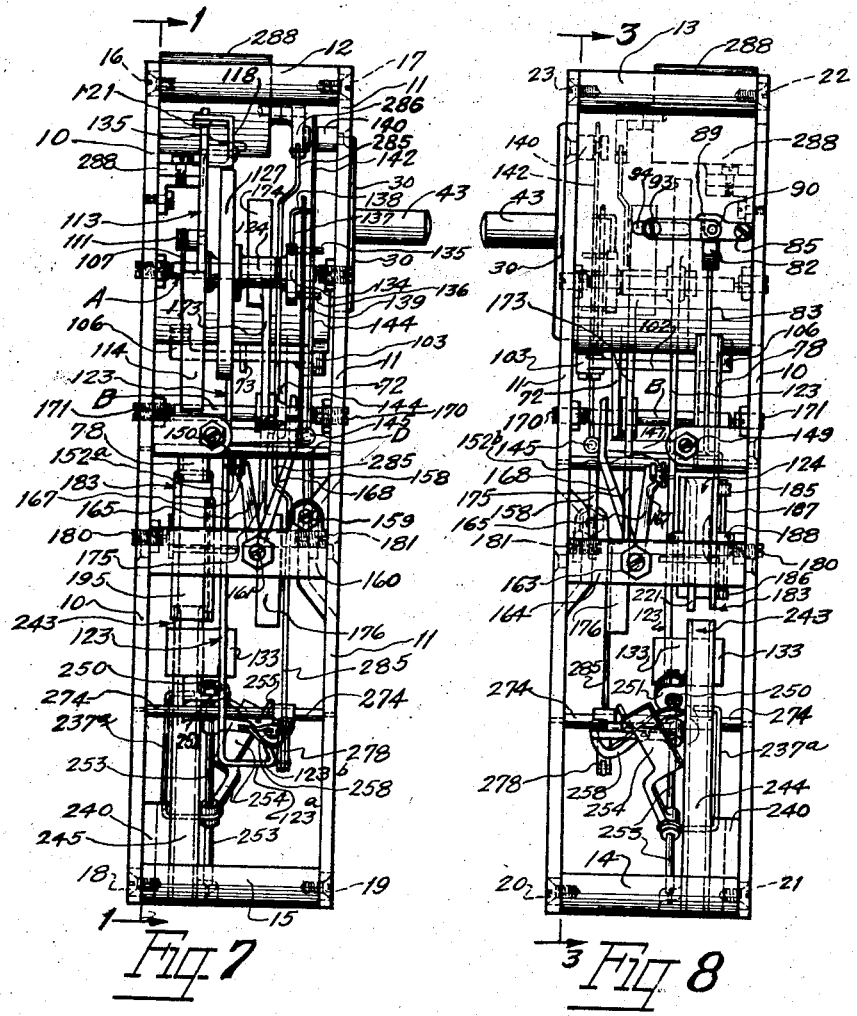
Figure 7 is an end view of my fraud preventive device looking from along the line 7—7 in Figure 1, and showing both side plates in position.
Figure 8 is a view of the opposite end from Figure 7 looking from along the line 8—8 in Figure 1 and showing both side plates in position.

Referring more specifically to the drawings the numeral 10 represents one of the side plates for supporting my mechanism, and the numeral 11 indicates the other side plate. These side plates are secured together by any suitable means such as spacing members 12, 13, 14 and 15, which span the distance between the side plates and hold the same in separated position, and holes are provided in the side plates through which screws 16, 17, 18, 19, 20, 21, 22 and 23 project and are threadably embedded in the spacing members to provide a strong framework in which my mechanism is supported. It is understood that this framework may be of any suitable material, shape or size to conform to any check controlled apparatus with which it is built to operate.

Referring to Figure 11 of the drawings I show a hole 24 in the upper left hand corner of side plate 10, this hole 24 is adapted to receive the front portion 25 of the cylindrical shell 26 which houses certain of my mechanisms for detecting irregularities in the surface configuration of checks. This cylindrical member 26 has a circular hole 27 therein through which checks are adapted to be fed to the configuration reading mechanism which will be presently described. The other end of this casing 26 has secured therein a circular plate member 28 by means of screws 29 penetrating the cylindrical member 26 and being threadably embedded in the plate member 28. This plate member 28 has a circular projecting portion 30, which extends through a hole in the plate 11. The tubular member 26 and the circular plate 28 secured therein are prevented from turning by means of a pin 31. Immediately within the hole 27 the cylindrical member 26 is enlarged for the rest of its length to a bore smaller than the disk 28, and slidably mounted in this bore is a tubular member 32 which has secured to the face portion thereof next to the hole 27 a disk 33 by means of screws 34 penetrating the disk 33 and being threadably embedded in the tubular member 32. This tubular member 32 has a plurality of longitudinally disposed grooves 35 and coinciding with these grooves 35 are a plurality of radially disposed grooves 36 on the front portion of the tubular member 32. A circumferential groove 37 is provided in which a ring member 38 is mounted, and on this ring member 38 are mounted the bell crank levers 39, there being one bell crank lever for each of the sets of longitudinal grooves 35 and radial grooves 36. Another circumferential groove 40 is provided in the tubular member 32, in which an endless tension spring 41 is mounted, said tension spring being adapted to press the bell crank levers normally to the position shown in Figure 11. Each of the bell crank levers 39 have the inwardly radially projecting portion 39a which are adapted to normally press against the inner heads of pins 42, said pins 42 being circumferentially arranged around the shaft 43 which will be later described. These pins 42 are slidably mounted in the plate 33, the operation of which will be later described.

Slidably mounted within the tubular member 32 is another tubular member 44 which likewise has a plurality of longitudinally disposed slots 45 on the outside thereof similar to the slots 35 in the member 32. This member 44 has a circumferentially arranged slot 46, in which a ring 47 is mounted which serves as a pivot point for bell crank levers 50, which are mounted in the longitudinally disposed slots 45, and coinciding with the longitudinally disposed slots 45 are a like number of radially disposed slots 51, in which portion 50a of the bell crank levers 50 project. These portions 50a of the bell crank levers 50 are adapted to fit against the pins 52 which are slidably mounted in the plate 35 in the same manner as the pins 42. A second circumferentially arranged slot 53 is provided in which an endless tension spring 54 is mounted to normally press the bell crank levers 50 into normal position as shown in Figure 11. The member 44 has the thinner portion 55 on the rear thereof, on which is slidably mounted a hollow tubular member 56, said member having a projecting ring 57 at the back portion thereof and having a circular hollowed out portion 58 in which a compression spring 59 is mounted, the other end of said compression spring fitting against an inside hollowed out portion 60 of the plate 28. The purpose of this tension spring is to normally force the member 56 to the left hand in Figure 11. On the inside of the member 44 there is a bore in which the shaft 43 is mounted, and a portion of this bore is enlarged as at 61, and a portion of the pin is enlarged as at 62, which enlarged portion is adapted to slide in the enlarged bore 61 and between the enlarged portion 62 and the base of the bore 61 is mounted a compression spring 63, which is mounted around the shaft 43, the purpose of said compression spring being to normally force the pin 43 into the position shown in Figure 11. This compression spring 63 also normally forces the member 44 forward against the plate 33, and said plate 33 being connected to the outer tubular member 32 also normally forces the tubular member 32 forward to the position shown in Figure 11. The pin 43 although being adapted to occupy the normal position shown in Figure 11 is adapted to be pushed to the left in Figure 11 out through a hole 64 in the plate 33 to expel any undesirable check after it has been inserted into the coin entrance if the check should be desired to be withdrawn and not to be released to operate the check controlled apparatus.

The plate member 28 has a circular flange 65 therearound which is adapted to normally engage the free end of the bell crank levers 39, it being evident that when a suitable check is placed against the pins 42 that all of the bell crank levers can be raised which will cause the ends thereof to miss the circular projection 65 and will allow movement of the member 32 carrying the bell crank levers with relation to the projection 65, and in case a check is introduced into the coin entrance which will not press inwardly all of the pins 42, it will cause some of the bell crank levers 39 to fail to be raised and therefore will prevent the opening of the coin entrance by means of the disk 33 and associated parts moving backwardly to allow the coins to drop downwardly into the machine. The pins 52, if they are all depressed by the face of a check or coin will cause the same to raise bell crank levers 50 outwardly at their free ends and to pass by the projection 57 and will allow the tubular member 44 to move with relation to the member 56 and will not move the member 56 at all. This member 56 has pivotally connected thereto as at 66 a circular member 67 which has an upwardly projecting arm 68 pivotally connected as at 69 in a member 70, which is secured in a suitable groove in the casing 26 by means of screw 71.

It is therefore evident that if the check or coin should fail to raise all of the bell crank levers 50 that some of the bell crank levers will still engage the circular projection 57, and will move the member 56 backwardly which will carry with it the circular member 67, which will move the lower portion thereof, which is designated by the reference character 72, and which will operate the mechanism which will be presently described. The tubular member 32 has also secured therein a pin 73, which moves in slot 74 in the casing 26, and the function of pin 73 will be presently described. The member 72 which is a portion of the ring shaped member 67 is adapted to move in a slot 75, and it is shown in its most forward position in Figure 11, it being evident that the pivot point 69 and the casing 26 against which the portion 72 is resting in Figure 11 will prevent the parts from moving any further to the left than the position shown in Figure 11.

The member 44 has a shoulder 76 thereon against which the end of the member 56 is adapted to fit when the member 44 with associated parts is pushed backwardly, it being evident that the member 56 limits the movement to the right in Figure 11 of the member 44, disk 33 and associated parts. This limitation of movement is really performed when the ring member 57 is pushed all the way back to the right into the cavity 60 as shown in Figure 11. It is evident that when all of the bell crank levers 50 are operated that the shoulder 76 will move toward the left hand end portion of the member 56 but will not cause the member 56 to move any further to the right, but when any of the bell crank levers 50 engage the flange portion 57 it will carry this member 56 backwardly into the cavity 60 and still preserve the spacing between the shoulder 76 and the member 50. In the lower portion of the cylindrical member 26 I provide the passageway 77 and to the lower end of that I secure a coin chute 78 which is adapted to deliver the checks or coins into the rest of my apparatus.

Figures 9, 10:
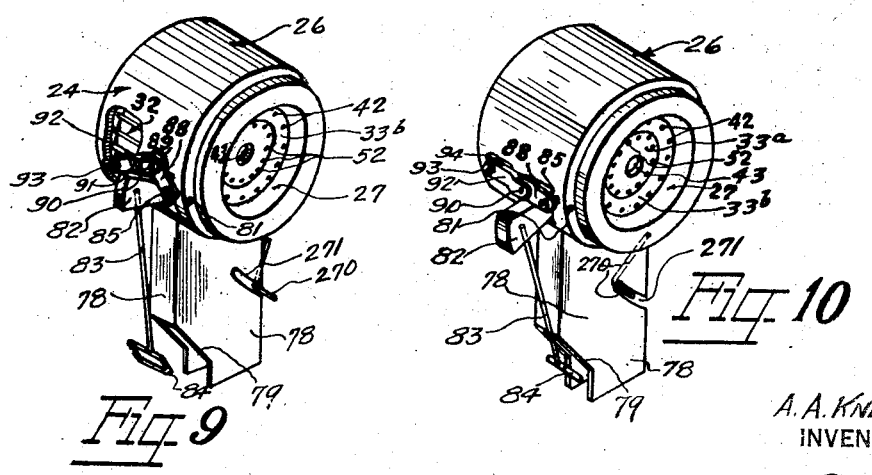
Figure 9 is a perspective view of the means for holding the coin entrance mechanism in open position and for tripping the same.
Figure 10 is a perspective view similar to Figure 9 and showing the parts in closed position.

In order to keep the coin entrance in open position when the same has been opened by a suitable check or coin I provide a slot 80 in the side of the tubular member 26, and pivotally mounted on a pin 81 is a lever 82 which has a downwardly projecting arm 83 and the chute 78 has a cut away portion 79 therein, and the lower end of the arm 83 has a sidewardly projecting portion 84 which projects into the path of the falling check or coin as it falls through the chute 78. A pin or screw 85 is fixedly secured in the casing 26 and is spaced away from the casing 86 by means of a space washer 87, and on this screw 85 is pivotally mounted a portion of the toggle joint mechanism represented by the reference character 88. This member 88 has a tongue 89 on the end thereof and pivotally secured to the member 88 as at 90 is the forked end 91 of lever 92. The tongue 89 is adapted to move in the forked end 91 and to rest on top thereof when the same is in the position shown in Figure 10. The member 92 is pivotally mounted on screw 93 which pierces slot 94 in casing 26 and is embedded in the member 32, so as to slide therewith. It is thus seen that when the member 32 and associated parts is pushed backwardly that the toggle joint mechanism will occupy a straight line position or approximately below straight line in the central portion thereof as shown in Figure 10, and will hold the coin or check entrance in open position, but when a coin or check falls downwardly through chute 78 it will engage the lower end of lever 83 as at 84, and will move the lever 82 upwardly and trip the toggle joint mechanism to the position shown in Figure 9 and will allow the coin or check entrance to be closed by the disk 33 and associated parts.

Pivotally secured on the pin 73 is the connecting link 100 which is pivotally connected as at 101 to the bell crank lever 102, which lever is pivotally mounted as at 103 on the supporting member 104, which is secured to the casing 26 by means of screws 105. This bell crank lever projects laterally across the machine and has a pin 106 projecting upwardly therefrom on which a link 107 is slidably mounted, said link 107 having a hook 108 on its end, which is slidably mounted is a circular groove 109 in pin 106. This link 107 has a coil 107a therein which provides resiliency and it projects backwardly in the machine and is pivotally mounted as at 110 on a pin 111, which is secured on a projection 112 of a member 113, said member 113 being fixedly mounted on a main shaft A. This member 113 has a weight 114 at one end thereof with a stop 115 preferably covered with rubber or any other suitable material, and the other end of the member 113 projects upwardly and over toward the casing 26 and then projects downwardly to the point 116. Secured in the member 113 is a pin 117 on which is pivotally mounted a lever 118 which projects downwardly and has an off-set portion therein providing a hook 119, the purpose of which will be later described. The shorter portion of the member 118 is T-shaped and is designated by the reference character 118a, and from one end of the portion 118a is a laterally projecting portion 121 which projects above the member 113, and the other end of this portion 118a has a laterally projecting portion 122 which projects into the bend of member 113, the purpose of these portions 121 and 122 being to limit the movement of the lever 118 in both directions.

The upper forward portion of 113 has a projection 113a which serves to stabilize the check releasing means in the balancing mechanism which will be later described. Pivotally mounted on the shaft A is the deflector operating member or bell crank lever 123 which has a barrel 124 integral therewith, with a bore 125 extending therethrough, through which bore 125 the shaft A is adapted to pass. This barrel 124 and the lever 123 are pivotally mounted on the shaft A. Projecting rearwardly from the pivot point is a portion 126 of the lever 123, which has a weight 127 integral therewith. The other portion of lever 123 projects downwardly, and has an enlarged portion 128 in which an arcuate slot 129 appears and also an enlarged V-shaped slot 130 having arcuate walls 130a and 130b and at the junction point of these two slots which are on the same arcuate line are notches 131 and 132, the purpose of which will be later explained. Just below the portion 128 there is secured to the member 123 a plate or vane 133, the purpose of which will be later described. Just below the point where the plate 133 is secured the member 123 makes an approximately right angle turn and projects forwardly, said portion being designated by the reference character 123a, and at the end thereof an upwardly projecting portion 123b appears, the purpose of which is to operate the deflector mechanism and which will be later described. Immediately above the portion 128 is a pin 290 which will be later described.

Fixedly mounted on the shaft A is the double crank member 134 which has pins 135 and 136 in the end portions thereof, and also projecting upward from the portion which has the pin 135 therein is an L-shaped pin 137, which has a right angle portion 138 which is adapted to operate in connection with a lever 139, which will be presently described. The lever 139 is fixedly secured in shaft D, which will be later described.

In the upper portion of the plate 11 a pin 140 is secured, which has a circular groove 141 therein, in which a loop 142 is adapted to slide, and said loop has the enlarged portion 143, which is adapted to pass on the outside of an arc described by the pins 135 and 136, so as to cause these pins to operate on the upper portion of the loop 143 at predetermined times. This loop portion 143 has integral therewith at the lower side thereof the portion 144 which is pivotally connected as at 145 to the arm 146, which arm is a part of the arm 147 which is fixedly secured on the shaft 148, which runs at right angles to shaft A, but being disposed below shaft A at some distance. This shaft 148 is pivoted at its ends in bearings 149 and 150 mounted in lugs 149a and 150a. Fixedly secured to the shaft 148 and projecting downwardly therefrom at the other end thereof from the point at which the lever 147 is secured is a lever 151, which projects downwardly and is adapted to open the balancing lever mechanism for the reception and discharge of a check as will be presently described.

It has already been explained that lever 139 is fixedly secured in the shaft D, which shaft D is pivotally mounted in the side walls 10 and 11. This shaft D has mounted thereon the resilient hook 152 which has the sloping portion 152a and the shoulder 152b, adapted at times to engage the pin 290 to prevent the member 123 from moving forward. Also fixedly secured in the shaft D is the projecting arm 157 which is adapted to cooperate with an upwardly projecting arm associated with other mechanism, which will be presently described. The shaft D also has the downwardly projecting arm 158 which projects downwardly and is adjusted as to its backward movement by means of a set screw 159 in block 160, which is secured to the side wall portion 11.

The block 160 is secured to sidewalls 10 and 11 and has the hook 153 secured thereon which supports a stabilizer 154, which has hole 154a adapted to be engaged by hook 153, and this stabilizer also has slot 154b in which pin 197 operates, as will be later described. A lower hook 155 is secured in block 160 and is adapted to prevent stabilizer from falling off hook 153 when the device is placed in any position. Pivotally mounted in a screw 161 appearing in bar 160 is a shaft 162 which projects through the machine to the other side thereof where it is pivotally mounted in a screw 163, which is mounted in a lug 164 on a side wall 11. A right angle lever 165 is fixedly secured on the shaft 162, and one end of this lever has a weight 166 thereon and the other end of this lever projects upwardly and has a notch 167 therein, which is adapted to engage the lever 157 projecting from shaft D, which holds the hook 152 in elevated position when the check is deflected, as shown in Figures 27 and 31, to engage the pin 290 in member 123. Near the other end of the shaft 162 is an upwardly projecting arm 168 which is fixedly secured to shaft 162, which projects upwardly in the path of the lever 72, which extends downwardly from the casing 26 as has been previously described.

By referring to Figures 1, 3, 7 and 8 it is seen that there are mounted in the side members 10 and 11 adjustable bearings 170 and 171, and in these bearings a shaft B is rotatably mounted, and on this shaft B is fixedly secured a governor member 172. This governor 172 comprises an arm 173, which is L-shaped and at the tip of this L-shaped arm is a weight 174. Another arm projects from the hub portion of this member 172, and this arm is located at approximately an angle of 180 degrees from the arm 172. This latter arm is designated by the reference character 175, and has a weight 176 on the end thereof. This arm 175 also is L-shaped and is very similar to the arm 172. Also projecting from the hub portion of 172 is a counter-weight 177, which is adapted to return the governor to normal position after operation of the machine. Projecting from one side of the top portion of member 172 is a pin 178, which has a vane 179 secured thereon, said vane projecting inwardly and being in close proximity to the shaft B. The purpose of this vane is to engage the lower end of member 118 and to deflect the same to cause the hook 119 to engage the lower end of the vane at the part where it goes around the pin 178 and holds the member 118 and associated parts in lowered position, for a moment, and the weight on the member 113, and also the weight 127 on member 123 causes the member 118 and associated parts to be raised upwardly and to move the governor to partial revolution until the lower end of member 118 strikes against the shaft B, and thus releases the hook 119 from vane 179, which allows the governor to return to normal position. This retarding movement is desired to give the balancing mechanism, which will be presently described, time to assume a position of rest, so that the member 123 which is retarded by the above described mechanism on account of weight 127 being held upward by pin 115 which causes the balancing mechanism to have time to assume a position of rest before the slot 129 moves forward to a point of engagement of coinciding with the balancing mechanism.

The slot 130 has the two edge portions 130a and 130b, edge 130a being so designed as to bring the balancing beam 182 and associated parts in balanced position when the pin 198 is resting in apex 130c of edges 130a and 130b, so that when a check of proper weight is passed into the balancing mechanism and when the lever 123 moves forward that pin 198 will register with slot 129. These edges 130a and 130b are arcuate and are described from a different center so that when a check is inserted into the entrance and the member 123 is moved backward and the pin 198 is resting in apex 130c, the beam 182 will be in a proper position to coincide with slot 129, it therefore being evident that while in this position the check is received into the balancing mechanism so that the balancing mechanism cannot be moved by the impact of the falling check and if the check is of proper weight the balancing mechanism will not move as it will be in proper position as the member 123 moves forward, but if the check is below or above a given weight the pin 198 will move downwardly or upwardly and engage one of the notches 132 or 131 and prevent the deflector operator 123 from moving forward to operate the deflector 254 and associated parts.

My balancing or weighing mechanism, which is adapted to receive a check or coin from the chute, comprises a shaft C which is rotatably mounted in the bearing members 180 and 181 secured to the side wall portions 10 and 11. This balancing mechanism has a main member or beam 182 which is fixedly secured on the shaft C, and this beam member projects beneath the chute 78 and has the enlarged portion 183 which enlarged portion has the circular opening 184. Mounted above and below, and just to one side of the enlarged opening are the bearing projections 185 and 186, in which a shaft 187 is mounted for turning movement. This shaft 187 has fixedly secured near the central portion thereof an arm 188, and on the end of this arm is fixedly secured the feeler member 189. Fixedly secured on the shaft C is the leaf spring member 190 which is forked at its free end as at 191, and this fork 191 fits around and against the feeler member 189, the function of this spring being to normally press the feeler member inwardly against the check or coin. Secured to the arm 188 is a stop wire 192, which projects backwardly beneath the balancing mechanism and is adapted at times to engage the plate 133 on member 123.

Secured to the side of the main balancing beam 182 is the downwardly projecting guard 193, which has an eye 194 on the lower end thereof through which the stop wire 192 is adapted to pass, but in normal operation this stop wire is not supposed to touch the eye member. At the end of the beam 182, which has the guard which has just been described, is a weight portion 195 which has an adjusting screw 196 threadably mounted therein for the purpose of balancing the beam perfectly. Projecting from the upper outer surface of this weight member is a pin 197 which projects into the slot 154b of stabilizer 154. On the other side of the beam which has just been described and projecting from the weight portion 195 is the pin 198 which projects normally into the slot 130, and when a coin or check is of proper weight it will register with the arcuate slot 129 in member 123, but when the coin or check is not of proper weight this pin will become engaged in one of the notches 131 or 132, and prevent the forward movement of the portion 123a of the member 123, which operates or fails to operate a deflecting mechanism which will be presently described. Even though the coin or check is of proper weight it will not coincide with the slot 129 due to the fact that if the coin or check is not of proper surface configuration it will fail to release the hook member 152 by failing to move the shaft 162 to release lever 157 from the notch in the lever 165, and therefore will not lower the hook member 152 to cause it to release the pin 290 and will prevent the deflector operator 123 and associated parts from moving beyond projection 152b. The hook 152 is resilient and normally presses against pin 290 and is thus prevented from releasing pin 290 due to vibration.

Projecting from the same side of the weight member 195 from which the pin 198 projects are the bearing lugs 200 and 201 and in these bearing lugs is turnably mounted the pin or shaft 202. Fixedly secured on this pin or shaft are the arms 203 and 204 which are joined together by the barrel member 205 through which pin 202 passes forming a pivot point for the arms 203 and 204. The arms 203 and 204 are integral with the barrel member 205, and approximately mid-way between the ends of these arm members the cross piece 206 is integral with these arms to make a rigid structure. These arms 203 and 204 project forwardly beneath the coin chute and slightly to one side thereof, and at the ends of these arm members the portion 207 is integral with these arm members, and the arm 208 projects further outwardly, said arm being integral with the cross piece 207. The inwardly projecting lugs 209 and 210 are positioned at the junction point of the arms 203 and 204 and the cross piece 207, and through these projecting lugs a pin 211 is turnably mounted and intermediate the bearing lugs there is fixedly secured to this pin 211 the arm 212, which has secured to the end thereof the feeler member 213 which projects inwardly to press against the central portion of the check or coin. A vertically disposed pin 214 is secured at the junction point of the feeler member 123 and the arm 212, and against this pin the fork on free end of spring 216 is adapted to press normally, which leaf spring is fixedly secured on the cross piece 206. Fixedly secured to the arm 212 is another stop member 218 which projects through the guide member 217, which is fixedly secured to the arms 203 and 204, and projects downwardly and has the guard 220 on the lower end thereof through which the stop member 218 passes. This stop member projects rearwardly and is adapted to engage the vane 133 in the same manner as the other stop member which has been previously described. Fixedly secured on the inside surface of the arms 203 and 204 near the free end thereof, is the guide member 221 which has an inwardly sloping surface at the upper end thereof in order to form a directing surface for the coin or check as it leaves the chute 78 and passes into the balancing mechanism. This member 221 has a vertically disposed slot 223 therein into which and through which the feeler member 213 is adapted to project under pressure of the leaf spring 216. The last named leaf spring presses the feeler member against the central portion of the coin or check, while a leaf spring 222 is secured to the member 195 and has its free end pressing against member 206 to normally hold the free ends of members 203 and 204 pressed inwardly which carries with said arms the member 221, which has just been described to cause it to press against the surface of the coin or check. At the end of the beam 182 in which the circular opening 184 appears the end of said beam is turned inwardly to form a vane 224 to serve as a guide for one edge of the coin or check. At the other edge of the enlarged portion 183 which is nearest to the pivot point of said beam, a guide member 225 is fixedly secured to direct and maintain the coin or check in position in association with the vane 224. Rearwardly of this last named guide member 225 and near the lower end thereof is mounted the pivot pin 226, on which is pivotally mounted the weighted lever 227 having the projection 227a, which is adapted to support the coin or check and prevent it falling through the beam until released. This weighted lever 227 is supported by the pin 228 and this weighted lever has the weighted portion 229 on the end thereof, and on the upper surface of this weighted portion 229 is a notch 230 in which the lower portion of bell crank lever 231 is adapted to normally rest, said bell crank lever 231 being pivotally mounted on pin 233, which pin is mounted in the projection 234 projecting upwardly from beam 182. This bell crank lever 231 has the fork 235 in the other end thereof which is adapted to be engaged by the hook 116 on the lower end of member 113 to raise this fork 235 upwardly which allows the lever 227 to be released by the lever 231 moving out of the path of portion 229, and its outer movement is limited by the pin 236, and the weight of the coin or check pressing on the portion 227a will raise the weighted portion 229 upwardly after the lever 231 has been moved out of its path against pin 236 to allow the coin or check to fall into the deflecting mechanism which will be presently described.

Secured to the lower portion of side member 10 is a spacer block 240 and this spacer block is held in position by means of the screws 241 and 242. Secured to this spacer block by welding or any other suitable means is the lower coin directing member 243. This coin directing mechanism has a vertically disposed passageway 244, and the angularly disposed passageway 245. The triangular shaped block 246 is inserted between the side members 247 and 248 which forms the side portions of the deflecting mechanism. The coin or check chute 244 leads to the exterior of the machine to pass undesirable checks or coins back to the operator and the angularly disposed chute 245 is adapted to deflect coins into the coin or check operated machine with which this fraud preventive device is adapted to be associated. The path which a check or coin will travel, that is as to whether or not it will be deflected into the machine or returned to the operator is determined by my deflecting mechanism which comprises the bearing member 249, and the bearing member 250 which bearing member 250 is mounted in the lug 251 which projects laterally from the upstanding member 252 which is integral with the coin chute mechanism. Mounted in the just referred to bearings, is the shaft 253 which has fixedly secured thereon the deflecting member 254 which has a pin 255 in the free end thereof for limiting the inward movement of said deflecting member. Also secured on shaft 253 is a wire or other suitable deflecting member 237 which extends laterally beneath slot 245 and upwardly and laterally, the upper lateral portion being designated by the reference character 237a the portion 237a occupying a position to block passageway 245 while deflector 254 is out of passageway 244. Fixedly secured on the shaft 253 is the slotted L-shaped lever 256 which has slot 257 therein, in which is pivotally mounted as at 258a the irregularly shaped pivoted lever 258. The free end of the lever 256 is slotted as at 259 and the bent over portion of lever 258 which is indicated by the reference character 260 is adapted to slidably work in this slot in the end of said lever, and of course it is apparent that when this lever 258 is moved that this arrangement limits the movement of said lever. The lever 256 has the arm 261 which is adapted to normally rest against the surface of lug 252. The lug 252 has a cavity 262 therein into which the pointed end 263 of lever 258 is adapted to project when the portion 123b of lever 123 engages the lever 258 and causes the portion 260 to slide inwardly, which allows the portion 263 to clear the edge of the lug 252 and to travel in the said cavity. The lever 258 is adapted to normally assume the position shown in Figures 4 and 6 due to gravity, and in this position it is seen that the deflecting portion 254 is held in the position shown in Figure 4, so that when a coin or check is released from the balancing mechanism, said coin or check will fall straight downward through passageway 244 and be delivered to the exterior of the machine, which is not a desirable coin or check as the deflecting mechanism must be operated in order to deflect the coin or check into the passageway 245 and into the check controlled apparatus. The mechanism just described also serves as a safety mechanism to prevent the machine from being jarred to cause the deflecting member 254 to swing into the passageway 244.

Secured to the shell 26 is a projection 238 on which is pivoted as at 239 a rocker arm 270 which has one end fitting into a slot 271 in the chute 78 and the other end of this lever has pivotally secured thereto the sliding hook member 272 which is slidably mounted in the lug 273 on the member 11, and the lower end of this member 272 is adapted to hook beneath the bell crank lever 231 to raise the same to drop a preceding check from the balancing mechanism as is more fully explained hereafter.

Figure 32:
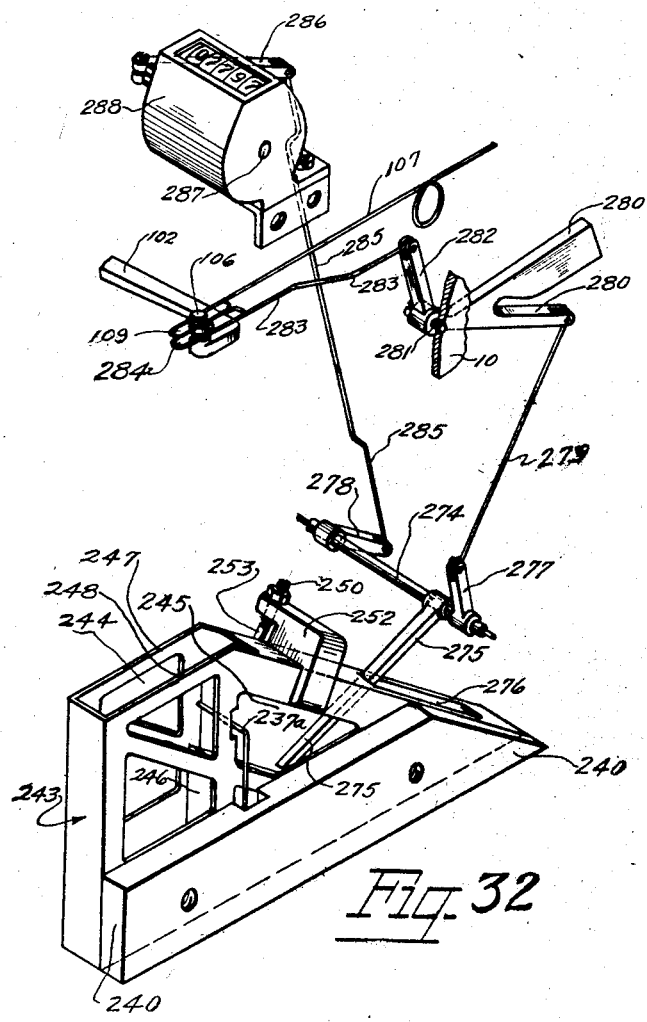
Figure 32 is a perspective view of the counting mechanism and associated parts.

Heretofore a problem has been presented in check controlled apparatus due to the fact that in collecting the money and checks received by the apparatus the attendants sometime are dishonest and will substitute slugs for genuine checks when taken from the cash box to the detriment and financial loss of the owners and operators of the check controlled apparatus. In order to overcome this difficulty I have devised means whereby an accurate record can be kept of the genuine checks which are received in to the cash box of the check controlled apparatus which is most clearly shown in Figure 32 of the drawings. This mechanism comprises a shaft 274 which is pivoted at its ends in the side walls 10 and 11 and this shaft has fixedly secured thereon a downwardly projecting finger 275 which projects through the slot 276 in the top of the passageway 245, so that it will be in the path of a check as it is passed into the check box or into the check controlled apparatus. This shaft 274 also has secured thereon the arm 277 and the arm 278, the arm 277 having pivotally secured thereto the connecting arm 279 which is pivotally secured at its upper end to the weighted member 280 which is pivoted to the side wall 10 by means of the pin 281 and this weighted member 280 has the lever 282 projecting upwardly therefrom which has pivotally mounted in the upper end thereof the connecting rod 283 which has an elongated eye 284 in the free end thereof which is adapted to have mounted in said eye the pin 106. The arm 278 has pivotally secured to the free end thereof the connecting rod 285 which has the upper end thereof secured to the counter lever 286 which counter lever is fixedly secured to the shaft 287 of the counter member 288 which is adapted to keep a record of each check and the total number of checks passed through the passageway 245. The operation of this counter is that when a check is inserted into the check entrance the lever 102 will pull the rod 283 toward the observer in Figure 32 and this will raise the parts to the position shown in Figure 32, and will set the counting mechanism so that the weighted portion 280a will aid the check when it strikes the finger 275 to work the counting mechanism. As the check passes through the device the lever 102 will move to the right in the slot 284 or elongated eye member 284 in the member 283 and leave the parts in the position shown in Figure 32, so that when the check passes all the other tests and is allowed to enter passageway 245 it will press the finger 275 backwardly and the falling of the weight 280a will operate the counting mechanism and the elongated eye will move away from the observer in Figure 32 back against the pin 106 in the member 102.

The member 270 and associated parts is designed to protect the mechanism from unscrupulous persons who might endeavor to tamper with the same by pushing the entrance into a certain point but not far enough to lock the same in open position and sliding the check downwardly and then following this by other checks which would cause the checks to probably enter the balancing mechanism with not sufficient force to operate the device. When the first check is thus inserted and slides down to the balancing mechanism and the second check is followed all of which is done without locking the entrance in open position, it would mean that a plurality of checks could be inserted one after the other and forced downwardly to injure the mechanism, and in order to avoid this possibility it is seen that when the first check passes the member 270 that the second check in passing member 270 will force the same outwardly and out of the slot 271 and will pull the rod 272 upwardly and will trip the holding means for the check in the balancing mechanism so that it is evident that each time a check passes the member 270 that a check will be released from the balancing mechanism by means of the operation to cause the rod 272 operating on the coin releasing means in the balancing mechanism. In this connection it is noted that the projection 113a would be resting above the forked portion 235 of the bell crank lever 231 and the projection 113a is devised for the purpose of causing the forked end 235 to hit against the projection 113a and rebound backwardly and downwardly to normal position quickly enough to catch the next coin which falls into the balancing mechanism as otherwise the member might not operate quickly enough to lock the member 227a and associated parts in position to catch the coin in the balancing mechanism.

*Method of operation with genuine check or coin*

I shall now proceed to describe the operation of my device when operated by a genuine coin or check. When a genuine coin or check is inserted into the coin entrance such a coin or check being of the type designated in Figure 12, which is an ordinary nickel or five cent piece in American money, the rim 300 will press all of the pins 42 and this will push inwardly the portions 39a of the bell crank levers 39 and will raise the other end of bell crank levers outwardly so that all of them will miss the circular projection 65 as shown in Figure 11. This will allow the member 32 and the plate 33 to slide in casing 26, and this will move pin 73 to the right in Figure 11, which will operate on the connecting rod 100, lever 102, rod 107 and will operate the lever 113 and associated parts, and this operation also will cause the projection 116 on the lever 113 to engage the fork 235, which is pivoted on the balancing lever and to return it to normal position as shown in Figure 25. At the same time the member 118 will move downwardly and hook 119 will become engaged with pin 173, and at the same time pin 136 moves upwardly and pin 135 moves downwardly (see Figure 29) and allows the loop 143 and associated parts to fall downwardly which causes the shaft 146 to have a partial revolution imparted thereto which allows the lever 151 to move slightly to the right in Figure 29, and this allows the portion 208, which carries the member 221 (see Figure 24) to move inwardly to press against the side of the check which has already fallen from the coin entrance mechanism down through the chute 78 and in falling through chute 78 engages the end 84 of lever 83 and trips the mechanism, which holds the coin entrance mechanism in open position and allows the same to close. This moving of lever 151 will allow the portion 208 and the coin feeling mechanism to press inwardly at the time the coin first is inserted into the coin entrance and while the pin 135 is moving downwardly, but upon a further insertion of the coin into the coin entrance the shaft A is continued to be revolved by the mechanism 100, lever 107 and other parts, and this causes pin 136 to press against the upper right portion of loop 143 as shown in Figure 29, and will cause the lever 146 to be raised upwardly, and will cause lever 151 to press against projection 208 and to open the coin receiving portion of the machine to allow the coin as it falls downwardly into the balancing mechanism to be received in the balancing mechanism. When the shaft A is revolved a portion of a revolution which has just been described the lever 137 of course will be turned (see Figure 27) and the portion 138 of said lever will move lever 139 which is connected to shaft D, and will raise the resilient hook 152 as shown in Figure 31 and also in Figure 29, and will cause the lever 157 to be raised upwardly into the notch 167, and if the coin is genuine its surface configuration will not be even, so only a portion of the bell crank levers 50 will be raised outwardly and some of them will engage the circular projection 57 and force member 56 backwardly, which will carry with it the lever 72 which will press against lever 168, and will force lever 165 over to allow lever 157 supporting the hook 152, to be lowered out of the path of pin 290.

The lever 158 will abut against set screw 159 which will place the hook 152 in proper position, and allow the pin 290 in the deflector operating mechanism 123 to pass by said hook. When a genuine coin is dropped into the balancing mechanism the feeler member 213 and 189 will engage the raised portion in the central portion of the check, and this will cause the stop wires 192 and 218 to spread outwardly to the dotted line position shown in Figure 23, and will cause them to miss the vane 133 on lever 123, and allow this lever 123 to move inwardly, and this being a genuine check the pin 198 will coincide with the slot 129 and this will cause the projection 123b to hit against the lever 258 and press it inwardly to cause the point 263 to miss the projection on which it would normally come in contact, and to project into the cavity 262 and this allows lever 256 to move which gives a partial rotation to rod 253, which causes the deflecting member 254 to travel into passageway 244 and deflect the coin or check into the passageway 245 which leads to the check controlled apparatus, and at the same time deflector 237a will move out of passageway 245 and also hook 152 will be lowered to allow pin 290 to pass by hook 152.

*Method of operation with a check similar to that shown in Figures 13 and 16*

In the description which has just been given as to the method of operation of a genuine check or coin such as that shown in Figure 12, it might here be stated that with all kinds of checks the first part of the operation is the part controlled by the raising outwardly of the crank arms 39 will take place with all of the other checks. If a check is produced which will not raise all of these arms 39 outwardly then the coin entrance will not be opened at all and no operation will take place, but in all of the various kinds of checks shown in my drawings the outer crank arms will be operated to open the check entrance as the outer periphery of the check is of such a configuration as to operate all of the crank arms 39 to allow the plate 33 to open. It is not thought necessary to explain again the operation of parts controlled by the opening of the plate 33 and the member 32 which is carried thereby. This operation will take place in all instances, in which checks such as those which are shown in the drawings are used. When a check is used similar to that shown in Figures 13 and 16 then not only will all of the outer crank arms 39 be opened to allow them to pass by the circular projection 65 in Figure 8, but also all of the crank arms 50 will also be moved outwardly at their free ends to allow the same to pass by the projection 57, and if all of these crank arms 50 pass by the projection 57 then the member 56 will not be moved, and the lever 72 projecting therefrom will not be moved and as this lever 72 (see Figure 27) controls the releasing means for the resilient hook 152, then it is evident that the hook 152 which is returned to a raised position by the returning of the parts to normal position when the preceding check or coin passes through the machine, then it is seen that when the check is passed on to the balancing mechanism that the hook 152 being in elevated position, and not being released by movement of lever 72, then the member 123 cannot move forward to operate the deflector mechanism. Also if the check is over or under weight then the pin 198 will engage the upper notch 131, or the lower notch 132 and the lever 123 will not be allowed to move forward to move the deflecting member 254 even if the hook is released by a check of proper configuration, and this will mean that the check or coin will drop straight downwardly in the passageway 244 and be returned to the operator. It might be stated that even though the check should be of given weight if it does not operate the member 72 to release the hook 152 then the member 123 cannot move forward to operate the deflector.

The check shown in Figures 14 and 18 would operate in exactly the same manner as the check shown in Figures 13 and 15, because both forms of the check would cause all of the pins and all of the crank arms to be operated as has been described for the check shown in Figures 13 and 15.

The operation of the mechanism when a check is dropped thereinto as has been described for Figures 13 and 16 would be the same for a check such as is shown in Figures 15 and 17, as the outer rim would operate all of the outer pins and crank arms and the inner surface being smooth would operate all of the inner pins and crank arms, and cause it to operate in the same manner as has been described for the check as shown in Figures 13 and 16. Likewise when a check is used such as shown in Figures 14 and 18 the operation would be the same as for a check such as shown in Figures 13 and 16, due to the same reason of the smoothness of the face of the check, as has been previously described.

In Figures 12 to 18 it will be noted that dotted lines appear, the outer dotted lines being designated by the reference character 301 and the inner dotted line being represented by the reference character 302. These dotted lines indicate that the dotted line indicated by the reference character 301 is the point on the check at which the outer ring of pins 42 will engage the check or coin, and the inner ring 302 denotes the point at which the inner ring of pins 52 will engage the check or coin.

It might be noted in this connection that the disk 33 has the raised central portion 33a against which the inner portion of the coin or check is adapted to fit while the outer or rim portion 300 such as shown in Figure 12, is adapted to fit into the lower portion 33b of the disk 33. The purpose of the arrangement of the raised portion 33a is to cause the machine to reject a check such as shown in Figure 17, in which case it is seen that the outer edge 300 will depress all of the pins 42 and the inner surface 303 will depress all of the inner pins 52, and if this arrangement were not present then the portion 300 would hold the surface 303 away from the pins 52 unless they projected out to a very substantial distance which would interfere with the operation of this machine, but by making the enlarged portion 33a project outwardly to fit a check of this nature, it causes the machine to reject it in two ways where without this arrangement, it would reject it only by the fact that the outer pins would all be forced out, and also the inner pins would be forced out and cause lever 72 to fail to operate.

It has already been described as to the operation of the stop wires 218 and 192 when a genuine check or coin such as shown in Figure 12 is inserted into the machine and passed on to the balancing mechanism. It was there seen that the stop wires would be held in open position as shown by the dotted lines in Figure 23. It is therefore evident that when a check or coin such as is shown in Figure 17 is dropped into the balancing mechanism that the feeler members 213 and 189 would press into the hollowed out portion 303 and this would not spread the stop wires 218 and 192, but would cause them to assume the position shown in bold lines in Figure 23. These stop wires not being spread out at their free ends will engage the vane 133 on lever 123 as the same swings forwardly, and this will prevent the portion 123b from engaging the lever 258 to operate the deflector 254, and since deflector 254 will not be operated then the check or coin would be dropped straight downwardly in passageway 244 and returned to the outside of the machine. The feelers 189 and 213 measure the relative thickness of the center of the check as compared with the rim portion of the check.

When a genuine check is inserted into the device and the member 123 is moved all the way to the right in Figure 1 and the pin 198 will be resting in the apex 130c, the device is so adjusted that the pin 197 will be resting lightly against the stabilizer 154 at the upper end of slot 154b and when the member 123 moves to the left in Figure 1 releasing the pin 198 from the apex 130c the stabilizer will prevent further upward movement of pin 197 and hold the balancing mechanism in a proper position to cause the pin 198 to allow the member 123 to move forward and will cause pin 198 to coincide with slot 129 in member 123. The adjustment is such that if the stabilizer should be removed that the weight of the genuine coin or check would cause the end of stabilizer 182 carrying pin 187 to move up too far to allow pin 198 to coincide with slot 129. The adjustment is such that if a coin or check is slightly above weight then it will raise the stabilizer bodily upward and will cause the pin 198 to engage the cavity 131 and therefore deflector operating member 123 will not move further forward.

In the drawings and specification I have set forth a preferred embodiment of my invention, and although specific terms are employed they are used in a generic and descriptive sense only, and not for purposes of limitation, the scope of the invention being set forth in the appended claims.

I claim:

1. In a fraud preventive apparatus for check controlled apparatus, a check testing device, means for receiving a check and passing the same to the check-testing device, means operable by the insertion of a second check if the first check fails to go through the testing device to clear the entire testing device and return first check to the exterior of the machine.

2. In a fraud preventive device for check controlled apparatus, said fraud preventive device having a check entrance and a passageway leading from said check entrance, a balancing mechanism located below said passageway, means in said balancing mechanism for holding a check therein, and means in said passageway operable by the insertion of a second check while the first check is in the balancing mechanism to release said first check to allow the same to pass through the balancing mechanism, and means cooperating with said releasing means and said balancing mechanism for retaining the second check in the balancing mechanism.

3. In a check controlled apparatus having a check entrance and a passageway through which checks are adapted to pass downwardly after passing through said check entrance, a balancing mechanism, a deflecting mechanism, means for operating the deflecting mechanism, means operable by the surface of the check for controlling said deflecting operating means, means in said balancing mechanism also adapted to be controlled by the surface of the check for controlling said deflecting operating means, and means operable by the insertion of a check into the said entrance and by the passage of said check in one direction through the machine for recording the passage of said check in one direction.

4. In a fraud preventive device for check controlled apparatus, a check testing mechanism, a chute for guiding checks to the testing mechanism, means 227 for supporting a check in the testing mechanism, means in the chute 270 operatively connected 272 to the supporting means, said means in the chute being operable by the passage of a check to release the supporting means to allow the same to move, under the weight of the check, to releasable position.

5. In a fraud preventive device for check controlled apparatus, a pivoted member, means for receiving and holding a check in one end of the pivoted member, a stabilizer for said pivoted member, means for swingably supporting said stabilizer free from said pivoted member, means in the pivoted member for engaging and moving said stabilizer when said pivoted member is moved a predetermined amount by a check therein, means for guiding a check after it is released from the pivoted member, means for releasing a check from the pivoted member, operating means for the guiding means, means for locking said operating means in inoperative position, means on the pivoted member for controlling the operating means, and means operable by the check when inserted into the device under pressure for releasing said means for locking the operating means.

6. In a fraud preventive device for check controlled apparatus, a balancing mechanism, means for guiding a check to the balancing mechanism, means in one end of the balancing mechanism for receiving and supporting a check, means operable by the insertion of a check into the device to open the balancing mechanism to receive the check and then to exert pressure on the check to gauge its thickness, means for storing the energy exerted by insertion of a check into the device, and means operable by the stored energy for again opening the balancing mechanism and releasing the check from the balancing mechanism.

7. In a fraud preventive device for check controlled apparatus, a balancing mechanism, means for guiding a check to the balancing mechanism, means in one end of the balancing mechanism for receiving and supporting a check, means operable by the insertion of a check into the device to open the balancing mechanism to receive the check and then to exert pressure on the check to gauge its thicknesss, means for storing the energy exerted by insertion of a check into the device, means operable by the stored energy for again opening the balancing mechanism and releasing the check from the balancing mechanism, a deflector for deflecting the check in one of two directions after it is released from the balancing mechanism, and means operable by the thickness gauging means and the balancing mechanism for controlling the deflector.

AARON A. KNEE.